(12) United States Patent
Uchida et al.

(10) Patent No.: US 10,457,593 B2
(45) Date of Patent: Oct. 29, 2019

(54) GLASS PLATE WITH FILM, TOUCH SENSOR, FILM AND METHOD FOR PRODUCING GLASS PLATE WITH FILM

(71) Applicant: Nippon Electric Glass Co., Ltd., Shiga (JP)

(72) Inventors: Hiroyuki Uchida, Shiga (JP); Masahiro Yoshino, Saitama (JP); Michinari Sone, Saitama (JP); Kayoko Fukuda, Saitama (JP); Noriko Nakajima, Saitama (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 244 days.

(21) Appl. No.: 15/516,135

(22) PCT Filed: Sep. 24, 2015

(86) PCT No.: PCT/JP2015/076964
§ 371 (c)(1),
(2) Date: Mar. 31, 2017

(87) PCT Pub. No.: WO2016/052306
PCT Pub. Date: Apr. 7, 2016

(65) Prior Publication Data
US 2018/0230043 A1      Aug. 16, 2018

(30) Foreign Application Priority Data

Oct. 3, 2014   (JP) .................................. 2014-204660

(51) Int. Cl.
*B32B 15/04*     (2006.01)
*B32B 17/06*     (2006.01)
(Continued)

(52) U.S. Cl.
CPC ...... *C03C 17/3671* (2013.01); *C03C 17/3642* (2013.01); *C03C 17/3644* (2013.01);
(Continued)

(58) Field of Classification Search
USPC .......................... 428/426, 428, 432, 434, 688
See application file for complete search history.

(56) References Cited

U.S. PATENT DOCUMENTS

| | | | |
|---|---|---|---|
| 2009/0197088 A1 | 8/2009 | Murata | |
| 2014/0116863 A1 | 5/2014 | Lee et al. | |

FOREIGN PATENT DOCUMENTS

| | | |
|---|---|---|
| JP | 2012-94115 | 5/2012 |
| JP | 2014-89689 | 5/2014 |

(Continued)

OTHER PUBLICATIONS

International Preliminary Report on Patentability dated Apr. 4, 2017 in International Application No. PCT/JP2015/076964.
(Continued)

*Primary Examiner* — Lauren R Colgan
(74) *Attorney, Agent, or Firm* — Wenderoth, Lind & Ponack, L.L.P.

(57) ABSTRACT

Provided is a glass sheet (1) with a film, including a laminated film (2), which includes a plurality of films laminated together, formed on a glass sheet (3). The laminated film (2) includes: an inorganic material film (4), which contains at least a noble metal, formed on the glass sheet (3); a plated metal film (5) formed on the inorganic material film; and a metal film (6) formed on the plated metal film (5). The laminated film (2) is black when viewed from a glass sheet (3) side.

9 Claims, 2 Drawing Sheets

(51) Int. Cl.
  *C03C 17/36*   (2006.01)
  *C03C 17/40*   (2006.01)
  *G06F 3/041*   (2006.01)
(52) U.S. Cl.
  CPC ...... *C03C 17/3649* (2013.01); *C03C 17/3697* (2013.01); *C03C 17/40* (2013.01); *C03C 2217/253* (2013.01); *C03C 2217/256* (2013.01); *C03C 2217/261* (2013.01); *C03C 2217/28* (2013.01); *C03C 2218/115* (2013.01); *C03C 2218/33* (2013.01); *G06F 3/041* (2013.01); *G06F 2203/04103* (2013.01); *G06F 2203/04112* (2013.01)

(56) References Cited

FOREIGN PATENT DOCUMENTS

| | | |
|---|---|---|
| JP | 2014-139129 | 7/2014 |
| KR | 10-2013-0110539 | 10/2013 |

OTHER PUBLICATIONS

International Search Report dated Oct. 27, 2015 in International Application No. PCT/JP2015/076964.

GLASS PLATE WITH FILM, TOUCH SENSOR, FILM AND METHOD FOR PRODUCING GLASS PLATE WITH FILM

TECHNICAL FIELD

The present invention relates to a glass sheet with a film, a touch sensor, a film, and a method of producing a glass sheet with a film.

BACKGROUND ART

As well known, in recent years, along with development of electronic devices and the like, there have been used a wide variety of glass sheets, such as: flat panel displays (FPD), for example, liquid crystal displays, plasma displays, field emission displays (including surface emission displays), and electroluminescence displays; substrates of sensors; covers for semiconductor packages of solid-state imaging devices, laser diodes, and the like; and substrates of thin-film compound solar cells.

Incidentally, for example, in a display apparatus to be used for a television, a personal computer, a smartphone, or the like, when a transparent base material, for example, a glass sheet, having an electrode formed thereon is arranged on the screen in such a manner that the transparent base material is on a user side, there is a risk of occurrence of: a situation in which the electrode is visible to a user; or a phenomenon such as black floating in an image. In order to solve such problem, there is a proposal of blackening the transparent base material side of the electrode (for example, Patent Literature 1).

CITATION LIST

Patent Literature 1: JP 2014-89689 A

SUMMARY OF INVENTION

Technical Problem

Meanwhile, as a method to be used in forming a metal film on a glass sheet in order to fabricate an electrode on the glass sheet, there are generally given vapor deposition, sputtering, and the like.

However, the vapor deposition or the sputtering often requires a reduced pressure environment. Accordingly, large-scale production equipment is used, resulting in an increase in production cost. In addition, in the vapor deposition or the sputtering, the glass sheet is often subjected to high ambient temperature during the treatment. Consequently, there is a risk in that stress may occur in the glass sheet and the metal film to peel off the metal film. In addition, in the vapor deposition or the sputtering, there is also a risk in that the formed metal film may have an increased surface roughness.

In view of the above-mentioned circumstances, a technical object of the present invention is to provide a glass with a film, a film, and a method of producing a glass sheet with a film, the film toeing capable of being produced without use of vapor deposition or sputtering, the film, which includes a metal film, being black when viewed from a glass sheet side.

Solution to Problem

A glass sheet with a film according to one embodiment of the present invention, which has been devised to achieve the above-mentioned object, is a glass sheet with a film, including a laminated film, which includes a plurality of films laminated together, formed on a glass sheet, wherein the laminated film includes an inorganic material film, which contains at least a noble metal, formed on the glass sheet, and a plated metal film formed on the inorganic material film, and wherein the laminated film is black when viewed from a glass sheet side.

In this configuration, the metal film is formed by plating, and hence the laminated film including the metal film can be formed without use of vapor deposition or sputtering. Therefore, a reduced pressure environment is not required in production. Accordingly, large-scale production equipment is not required, and hence production cost can be reduced. In addition, the glass sheet is not subjected to high ambient temperature during treatment, and hence stress due to heat does not occur in the glass sheet and the metal film. Consequently, peeling-off of the metal film can be suppressed. In addition, because the metal film is formed by plating, the surface roughness of the metal film can be decreased as compared to the vapor deposition or the sputtering. As described above, according to the glass sheet with a film of the present invention, the glass sheet with a film, the film being capable of being produced without use of vapor deposition or spattering, the film, which includes the metal film, being black when viewed from the glass sheet side, can be provided.

The reason why the laminated film is black when viewed from the glass sheet side in the above-mentioned configuration has not yet been elucidated clearly, but for example, the following is conceivable. In the case of only the inorganic material film containing the noble metal, which is formed on the glass sheet, the inorganic material film is deep red when viewed from the glass sheet side. Then, after the plated metal film has been formed on the inorganic material film, the laminated film is black when viewed from the glass sheet side. Therefore, it is considered that the laminated film is black when viewed from the glass sheet side because of a compound, (e.g., gold bromide, silver chloride, platinum chloride, palladium chloride, or ruthenium oxide) generated through the occurrence of some reaction between the noble metal in the inorganic material film and a metal in the plated metal film.

In the above-mentioned configuration, it is preferred that the plated metal film be formed by electroless plating.

With this configuration, the inorganic material film containing the noble metal can be used as a catalyst for the electroless plating, and hence the plated metal film can be easily formed by the electroless plating.

In the above-mentioned configuration, it is preferred that the laminated film further include a metal film formed by electroplating on the plated metal film.

With this configuration, the electroplating provides a higher formation rate of the metal film as compared to electroless plating, and hence the metal film portion of the laminated film can be efficiently formed.

In the above-mentioned configuration, it is preferred that the plated metal film formed by electroless plating be formed of copper or nickel.

With this configuration, copper and nickel are metal materials that can be finely etched, and hence the laminated film can be finely etched.

In any one of the above-mentioned configurations, it is preferred that the glass sheet have a thickness of 300 μm or less.

With this configuration, the glass sheet has flexibility, and hence the glass sheet with, a film can be used for an electronic device for, for example, a display having a curved screen.

In any one of the above-mentioned configurations, when the laminated film is processed to have a shape of an electrode for a touch sensor, the glass sheet with a film is suitable for a touch sensor. In addition, the above-mentioned object can also be achieved by a touch sensor including the glass sheet with a film of this configuration.

A film according to another embodiment of the present invention, which has been devised to achieve the above-mentioned object, is a film, including: an inorganic material film, which contains at least a noble metal, formed on a glass sheet; and a plated metal film formed on the inorganic material film, wherein the film is black when viewed from a glass sheet side.

In this configuration, substantially the same action and effect as those of the glass sheet with a film described at the beginning of the "Solution to Problem" section can be obtained.

A method of producing a glass sheet with a film according to still another embodiment of the present invention, which has been devised to achieve the above-mentioned object, is a method of producing a glass sheet with a film, including forming a laminated film, which includes a plurality of films laminated together, on a glass sheet, the forming the laminated film including: forming an inorganic material film, which contains at least a noble metal, on the glass sheet; and forming a plated metal film on the inorganic material film, wherein the laminated film is black when viewed from at glass sheet side.

In this configuration, substantially the same action and effect as those of the glass sheet with a film described at the beginning of the "Solution to Problem" section can be obtained.

Advantageous Effects of Invention

As described above, according to the present invention, the glass sheet with a film, the film, and the method of producing a glass sheet with a film, the film being capable of being produced without use of vapor deposition or sputtering, the film, which includes a metal film, being black when viewed from a glass sheet side, can be provided.

DESCRIPTION OF EMBODIMENTS

An embodiment of the present invention is described with reference to the drawings.

Figure 1:
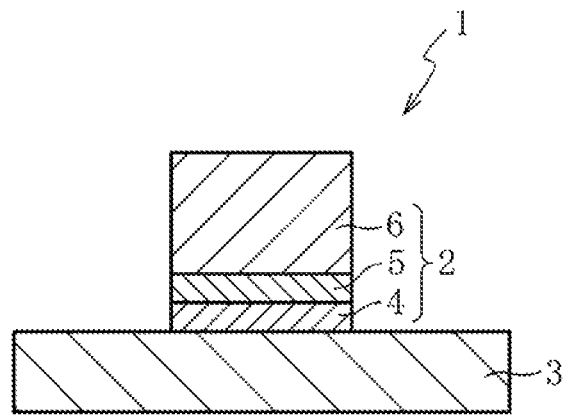
FIG. 1 is a cross-sectional view for illustrating a glass sheet with a film according to a first embodiment of the present invention.

FIG. 1 is a cross-sectional view for illustrating a glass sheet with a film according to a first embodiment of the present invention. A glass sheet 1 with a film illustrated in FIG. 1 includes a laminated film 2, which includes a plurality of films laminated together, formed on a glass sheet 3. The laminated film 2 includes an inorganic material film 4, which contains at least a noble metal, formed on the glass sheet 3, and a plated metal film 5 formed on the inorganic material film 4. In addition, the laminated film 2 is black when viewed from the glass sheet 3 side. Examples of the noble metal include gold, silver, platinum, palladium, and ruthenium.

In the first embodiment, the plated metal film 5 is formed by electroless plating in which the inorganic material film 4 is used as a catalyst. In addition, the laminated film 2 further includes a metal film 6 formed by electroplating on the plated metal film 5.

A material for the glass sheet 3 is not particularly limited, and examples thereof include soda lime glass and alkali-free glass. In addition, the material may be aluminum silicate glass for use as tempered glass.

The thickness of the glass sheet 3 is also not particularly limited, but is, for example, from 10 μm to 300 μm, preferably from 20 μm to 200 μm, most preferably from 50 μm to 100 μm. When the thickness of the glass sheet 3 is less than 10 μm, the glass sheet may be warped or wrinkled owing to the stress of the plated metal film 5. In addition, when the thickness of the glass sheet 3 is more than 300 μm, the glass sheet 3 has almost no flexibility, and hence it may be impossible to use the glass sheet 1 with a film for an electronic device for, for example, a display having a curved screen.

The inorganic material film 4 containing at least a noble metal is obtained by, for example, applying gold sodium sulfite, silver chloride, hexachloroplatinic (IV) acid hexahydrate, palladium chloride, ruthenium chloride, or the like to tin chloride, zinc chloride, copper chloride, or the like capable of being easily adsorbed on the glass sheet 3. The inorganic material film 4 may contain, for example, a metal serving as a catalyst for electroless plating, such, as nickel, cobalt, or copper, in addition to the noble metal. In the first embodiment, the inorganic material film 4 is formed, for example, in the following manner. The glass sheet 3 is immersed in a solution containing one kind or a plurality of kinds or more of tin, zinc, and copper, to adsorb ions of the metals on a surface of the glass sheet 3, and is then immersed in an aqueous solution containing the noble metal. Thus, due to a difference in ionization tendency, ions of the metals such as tin, zinc, and copper are replaced with noble metal ions, with the result that a film containing the noble metal or a noble metal compound as a main component is formed on the glass sheet 3. Then, the glass sheet 3 having the film formed thereon is immersed in a reducing solution. Thus, the noble metal in the vicinity of the surface of the film is reduced into a state of having a catalytic action for electroless plating. The inorganic material film 4 thus formed is a substance that can be etched with an etching solution for copper or nickel.

The thickness of the inorganic material film 4 is, for example, from 0.07 μm to 1.0 μm, more preferably from 0.1 μm to 0.7 μm, most preferably from 0.2 μm to 0.5 μm. When the thickness of the inorganic material film 4 is less than 0.07 μm, the plating rate of electroless placing may become extremely low. When the thickness of the inorganic material film 4 is more than 1.0 μm, the laminated film 2 may not be black when viewed from the glass sheet 3 side, under the influence of the red color of the inorganic material film 4.

The plated metal film 5 is not particularly limited, but copper or nickel is preferred from the viewpoint that the metal material can be finely etched. Copper has low electrical resistance, and exhibits good film uniformity in electroless plating. In addition, as compared to copper, nickel has an advantage of having low reflectance (being black), and is suitable for a small-area display apparatus. In addition, electroless plated nickel also has an advantage of having satisfactory adhesiveness for the inorganic material film 4.

The thickness of the plated metal film 5 is, for example, from 0.05 µm to 5.0 µm, mote preferably from 0.1 µm to 1.0 µm, most preferably from 0.2 µm to 0.5 µm. When the thickness of the plated metal film 5 is less than 0.05 µm, the laminated film 2 may not be black when viewed from the glass sheet 3 side. When the thickness of the plated metal film 5 is more than 5.0 µm, it may take time to form the film, resulting in lowering of production efficiency.

The metal film 6 is not particularly limited, but in consideration of use as an electrode, its electrical resistance is preferably low. From this viewpoint, copper and nickel are suitable. Electro-less plated copper and electroplated copper each has a volume resistivity of 3 µΩ·cm, and electroplated nickel has a volume resistivity of 8 µΩ·cm. In addition, as described above, copper or nickel is preferred also from the viewpoint that the metal material can be finely etched.

The thickness of the metal film 6 is, for example, from 0.1 µm to 5.0 µm, more preferably from 0.3 µm to 3.0 µm, most preferably from 0.5 µm to 2.0 µm. When the thickness of the metal film 6 is less than 0.1 µm, the advantage of the metal film 6 may not foe sufficiently obtained. When the thickness of the metal film 6 is more than 5.0 µm, production cost may increase.

When the plated metal film 5 is formed of electroless plated copper and the metal film 6 is formed of electroplated copper, the laminated film 2 having satisfactory thickness uniformity and low resistivity is obtained in a short period of time. In addition, although the plated metal film 5 may be formed of electroless plated nickel and the metal film 6 may be formed of electroplated nickel, the resistivity of the laminated film 2 can be further lowered when the plated metal film 5 is formed of electroless plated nickel and the metal film 6 is formed or electroplated copper.

When the plated metal film 5 is formed of electroless plated copper and the metal film 6 is formed of electroless plated copper, both are formed of copper, and hence fine processing by etching can be easily performed.

When the plated metal film 5 is formed of electroless plated copper and the metal film 6 is formed of electroless plated nickel or electroplated nickel, the surface of the laminated film 2 is formed of nickel, and hence its corrosion resistance is excellent.

When the plated metal film 5 is formed of electroless plated nickel and the metal film 6 is formed of electroplated copper, an inexpensive plating bath can be used, and hence the laminated film 2 having low resistance can be formed inexpensively with good productivity.

When the plated metal film 5 is formed of electroless plated nickel and the metal film 6 is formed of electroless plated copper, the laminated film 2 having satisfactory thickness uniformity can be formed. In addition, even when an inexpensive copper sulfate aqueous solution is used as a plating bath, the plated metal film 5 is not altered, and there is no fear of lowering of adhesiveness for the inorganic material film 4.

When the plated metal film 5 is formed of electroless plated nickel and the metal film 6 is formed of electroless plated nickel or electroplated nickel, both are formed of nickel, and hence fine processing by etching can be easily performed. In addition, the surface of the laminated film 2 is formed of nickel, and hence its corrosion resistance is excellent.

Figure 2:
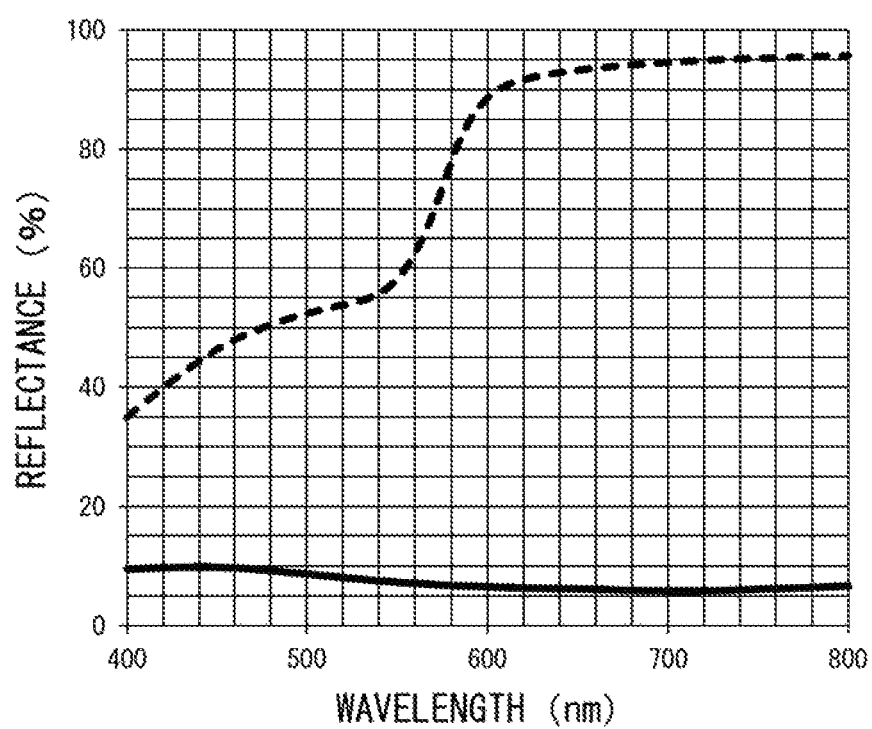
FIG. 2 is a graph for showing results of measuring the reflectance of a laminated film from a glass sheet side at different wavelengths.

FIG. 2 is a graph for showing results of measuring the reflectance of the laminated film 2 from the glass sheet 3 side at different wavelengths. The laminated film 2 used in the measurement is formed of the inorganic material film 4 containing silver formed on the glass sheet 3, and the plated metal film 5 formed on the inorganic material film 4 (the metal film 6 of FIG. 1 is not formed), and the plated metal film 5 is electroless plated nickel. In addition, the reflectance in FIG. 2 was obtained by removing about 4% of reflected light from an interface between the glass sheet 3 and air.

Data represented by a solid line is the reflectance of the laminated film 2, and data represented by a dashed line is the reflectance of copper for comparison. It is found that, as compared to the reflectance of copper, the reflectance of the laminated film 2 is low, specifically 10% or less, and besides, a difference in its reflectance between different wavelengths is small. Accordingly, it can be understood that the laminated film 2 is black when viewed from the glass sheet 3 side, and when the laminated film 2 is used as an electrode to be arranged on a screen, the following effect is high: a situation in which the laminated film 2 is visible to a user or a phenomenon such as black floating in an image is suppressed.

The reflectance of the laminated film 2 is preferably 30% or less, most preferably 10% or less.

The glass sheet 3 with a film according to the first embodiment configured as described above can provide the following effects.

The laminated film 2 including the plated metal film 5 and the metal film 6 can be formed without use of vapor deposition or sputtering. Therefore, a reduced pressure environment is not required in production. Accordingly, large-scale production equipment is not required, and hence production cost can be reduced. In addition, the glass sheet 3 is not subjected to high ambient temperature during treatment, and hence stress due to heat does not occur in the glass sheet 3 and the plated metal film 5 or the metal film 6. Consequently, peeling-off of the plated metal film 5 and the metal film 6 can be suppressed. In addition, the plated metal film 5 and the metal film 6 are formed by plating, and hence the surface roughness of each of the plated metal film 5 and the metal film 6 can be decreased as compared to vapor deposition or sputtering. As described above, according to the first embodiment, the glass sheet 3 with a film, the film being capable of being produced without use of vapor deposition or sputtering, the laminated film 2, which includes the plated metal film 5 and the metal film 6, being black when viewed from the glass sheet 3 side, can be provided.

In addition, when the plated metal film 5 and the metal film 6 are each formed of copper or nickel, the inorganic material film 4 can be simultaneously etched together with the plated metal film 5 and the metal film 6 through the use of the same etching solution. With this, when the laminated film 2 is processed by etching, processing accuracy can be Improved and production efficiency can be improved. In addition, when etching is performed, even the inorganic material film 4 can be etched without leaving a residue. Accordingly, in the etched portion, the glass sheet 3 is exposed, light scattering does not occur when light is transmitted, and satisfactory optical characteristics are obtained.

Next, the glass sheet 3 with a film according to a second embodiment of the present invention is described.

Figure 3:
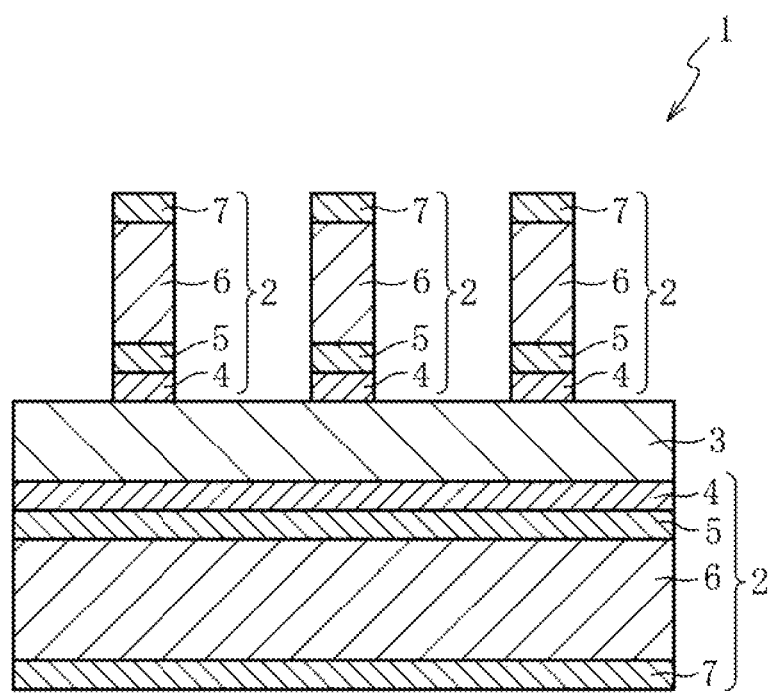
FIG. 3 is a cross-sectional view for illustrating a glass sheet with a film according to a second embodiment of the present invention.

As illustrated in FIG. 3, in the second embodiment, the laminated films 2, 2 are formed on both surfaces of the glass sheet 3. In the glass sheet 3 with a film according to the second embodiment, the laminated films 2, 2 are each processed to have the shape of an electrode for a touch sensor. Specifically, the laminated films 2, 2 are each patterned (processed) by etching to have the shape of an electrode for a touch sensor. The laminated films 2, 2 each have a so-called mesh-type electrode pattern. That is, the laminated films 2, 2 extend as a plurality of parallel lines at intervals in plan view on both surfaces of the glass sheet 3, respectively. In addition, in plan view, the laminated film 2 on one surface side of the glass sheet 3 is orthogonal to the laminated film 2 on the other surface side thereof.

In the second embodiment, the plated metal films 5, 5 of the laminated films 2, 2 are electroless plated copper films, and the metal films 6, 6 of the laminated films 2, 2 are electroplated copper. In addition, on the surfaces of the metal films 6, 6, black copper oxide coating films 7, 7 are formed. Therefore, the laminated films 2, 2 are black when viewed from any one of the surface sides of the glass sheet 3. Therefore, irrespective of which surface of the glass sheet 3 is arranged on a user side, the following effect is obtained: a situation in which an electrode is visible to a user or a phenomenon such as black floating in an image is suppressed.

When linear electrodes in different directions are formed on both surfaces of the glass sheet 3 as in the second embodiment, there is a risk in that moire unevenness may occur. However, when the thickness of the glass sheet 3 is set to, for example, 200 μm or less, the alignment accuracy of the electrode patterns on both surfaces of the glass sheet 3 is improved, and hence moire unevenness hardly occurs. When the thickness of the glass sheet 3 is set to even 100 μm or less, the alignment accuracy of the electrode patterns on both surfaces of the glass sheet 3 is further improved. In addition, even parallax when viewed from an oblique direction is decreased, and hence electrodes can be arranged between pixels over the entire surface of a display. Accordingly, an advantage is obtained in that the loss in aperture ratio in the electrode patterns of a touch sensor is reduced.

In addition, as compared to a resin film, the glass sheet 3 is free of expansion or shrinkage and is free of stretching or a wrinkle due to an externally applied force, and a mesh-type electrode pattern can be formed thereon with good accuracy. Particularly when electrodes are formed on both surfaces of the glass sheet 3 as in the second embodiment, this effect becomes remarkable. In combination with the effect, in a photolithography process, high accuracy positioning can be achieved by turning the glass sheet 3 over after patterning on one surface thereof and patterning the other surface in alignment with the already formed pattern, instead of simultaneously exposing both surfaces.

In addition, when the glass sheet 1 with a film Is used for a touch sensor as in the second embodiment, the width of an electrode needs to be made as fine as, for example, 3 μm in order to suppress the lowering of image quality, and high accuracy etching is required. In this regard, copper and nickel are both materials that can be etched with an aqueous sulfuric acid solution, and hence when the plated metal film 5 and the metal film 6 are each formed of copper or nickel, processing accuracy can be enhanced through simultaneous etching using the same etching solution.

Example 1

The inventors of the present application evaluated the glass sheet with a film according to the present invention for the processability of its laminated film.

For the glass sheet with a film to be evaluated, OA-10G manufactured by Nippon Electric Glass Co., Ltd. (thickness: 200 μm) was used as the glass sheet. On one surface of the glass sheet, a laminated film formed of an inorganic material film, a plated metal film, and a metal film was formed. The inorganic material film was formed by the above-mentioned method. The plated metal film was electroless plated nickel having a thickness of 0.4 μm, and the metal film was electroplated copper having a thickness of 3 μm.

The laminated film of the glass sheet with a film was subjected to patterning using a photolithography method as described below. The surface of the electroplated copper was subjected to ultrasonic cleaning with acetone, replaced with isopropyl alcohol, and then washed with water, followed by spin drying. Next, the surface of the electroplated copper was spin-coated with a photoresist through the use of AZ1500 manufactured by AZ. After the coating with the photoresist, the resultant was prebaked on a hot plate at 100° C. for 90 seconds. Next, mask pattern exposure was performed with a contact exposure machine. Development was performed with a TMAH alkaline solution of NMD-3 manufactured by Tokyo Ohka Kogyo Co., Ltd. Then, the resultant was washed with water, dried, and then postbaked at 120° C. for 2 minutes. Thus, a resist pattern serving as an etching mask was completed.

For etching, first, the copper and nickel films were etched with an aqueous sulfuric acid solution. In this Example, with regard to the composition of the aqueous sulfuric acid solution, an aqueous solution having a hydrogen peroxide concentration of 1.5% and a sulfuric acid concentration of 5% was used. The solution was heated to 60° C. to perform etching. The laminated film was able to be etched in 3 minutes. With the aqueous sulfuric acid solution, the etching rate of the inorganic material film is low, and hence the etching of the inorganic material film was performed with CPB-40N, an etching solution for copper manufactured by Mitsubishi Gas Chemical Company, Inc. Specifically, a solution obtained by diluting CPB-40N 10-fold with water was heated to 60° C., the glass sheet was immersed in the resultant solution and became transparent in 90 seconds. The etching was able to be performed without leaving a residue.

The present invention is not limited by the foregoing description, and various modifications are possible without departing from the technical spirit of the present invention. For example, in each of the above-mentioned embodiments, the laminated film includes the metal film formed by electroplating in addition to the inorganic material film and the plated metal film. However, the laminated film does not need to include the metal film. In addition, in each of the above-mentioned embodiments, the laminated film of the glass sheet with a film is used as an electrode. However, the glass sheet with a film may be used merely as a sheet that appears to be black, for a decoration or the like.

REFERENCE SIGNS LIST

1 glass sheet with film
2 laminated film
3 glass sheet
4 inorganic material film
5 plated metal film
6 metal film

The invention claimed is:

1. A glass sheet with a film, comprising a laminated film, which includes a plurality of films laminated together, formed on a glass sheet, wherein the laminated film includes an inorganic material film, which contains at least a noble metal, formed on a non-reformed surface of the glass sheet, and a plated metal film formed on the inorganic material film, and wherein the laminated film is black when viewed from a glass sheet side.

2. The glass sheet with a film according to claim 1, wherein the plated metal film is formed by electroless plating.

3. The glass sheet with a film according claim 2, wherein the laminated film further includes a metal film formed by electroplating on the plated metal film.

4. The glass sheet with a film according to claim 2, wherein the plated metal film formed by electroless plating is formed of copper or nickel.

5. The glass sheet with a film according to claim 1, wherein the glass sheet has a thickness of 300 µm or less.

6. The glass sheet with a film according to claim 1, wherein the laminated film is processed to have a shape of an electrode for a touch sensor.

7. A touch sensor, comprising the glass sheet with a film of claim 6.

8. A film, comprising:

an inorganic material film, which contains at least a noble metal, formed on a non-reformed surface of a glass sheet; and a plated metal film formed on the inorganic material film, wherein the film is black when viewed from a glass sheet side.

9. A method of producing a glass sheet with a film, comprising forming a laminated film, which includes a plurality of films laminated together, on a glass sheet, wherein the forming of the laminated film comprises:

forming an inorganic material film, which contains at least a noble metal, on a non-reformed surface of the glass sheet; and forming a plated metal film on the inorganic material film, wherein the laminated film is black when viewed from a glass sheet side.

\* \* \* \* \*